United States Patent [19]
Ruttenberg

[11] Patent Number: 4,938,420
[45] Date of Patent: Jul. 3, 1990

[54] DEVICE FOR IRRIGATING PLANTS

[76] Inventor: Gideon Ruttenberg, 101-B Stern Street, Kiron, Israel

[21] Appl. No.: 320,695

[22] Filed: Nov. 12, 1981

[30] Foreign Application Priority Data

Nov. 19, 1980 [IL] Israel .......................................... 61522
Sep. 11, 1981 [IL] Israel .......................................... 63792

[51] Int. Cl.$^5$ ............................................. A01G 27/00
[52] U.S. Cl. ..................................... 239/68; 137/132; 222/416; 239/542
[58] Field of Search .................. 239/68, 34, 37, 542; 222/416; 137/132

[56] References Cited

U.S. PATENT DOCUMENTS

| | | | |
|---|---|---|---|
| 872,359 | 12/1907 | Lowry | 137/132 |
| 1,226,758 | 5/1917 | Dufty | 137/132 |
| 1,562,542 | 11/1925 | Cox | 137/132 |
| 1,834,381 | 12/1931 | Caps | 137/132 |
| 3,216,663 | 11/1965 | Frampton et al. | 239/68 |
| 4,223,837 | 9/1980 | Gubbiotti | 47/48.5 |

FOREIGN PATENT DOCUMENTS 1243914  9/1960  France .............................. 137/132

Primary Examiner—Andres Kashnikow
Assistant Examiner—Michael J. Forman
Attorney, Agent, or Firm—I. Louis Wolk

[57] ABSTRACT

A device for irrigating plants comprises a container adapted to be mounted adjacent to each plant to be irrigated and to be filled at a low rate over a long period of time, for example around-the-clock. The container further includes a water discharge conduit having a loop portion at a pre-fixed height above the container bottom, the arrangement being such that when the water has accumulated within the container to substantially the top of the loop portion, there is produced automatically, and without the movement of any parts, a siphonic-flow-discharge of the water container at a high rate and over a short period of time.

1 Claim, 2 Drawing Sheets

DEVICE FOR IRRIGATING PLANTS

SUMMARY OF THE INVENTION

The present invention relates to a device for irrigating plants, particularly trees.

The methods most commonly used today for irrigating plants via water supply pipes are generally based on either the sprinkler system or the drip irrigation system. In the sprinkler system, the plants are supplied with irrigating water by sprinklers at a relatively high rate and over a relatively short period of time, whereas in the drip irrtigation system, the root regions of the plants are supplied with water at a low rate and over a relatively long period of time. Both of these systems, however, are relatively expensive to install, operate and maintain. In addition, the drip irrigating system is highly susceptible to clogging.

Another method heretofore proposed is to provide the plants with containers which are filled with water at a low rate over a long period of time, the water being periodically discharged from the containers to the plants at a high rate over a short period of time. However, the known proposed arrangements operating according to this technique usually include relatively complicated devices having moving parts to be actuated in order to periodically discharge the container, which divices are not only expensive to manufacture and to maintain, but also are not always reliable in operation under field conditions.

BRIEF SUMMARY OF THE INVENTION

An object of the present invention is to provide a new irrigating device having advantages in the above respects.

According to a broad aspect of the present invention, there is provided a device for irrigating plants, characterized in that the device comprises: a container adapted to be mounted adjacent to a plant to be irragiated, the upper end of the container being vented to the atmosphere; water inlet means connectable to a water supply pipe for inletting water into the container at a low rate over a long period of time; and a water discharge conduit carried by said container, said conduit including an inlet portion having an open inlet end within the container in pre-fixed position adjacent to its bottom, an outlet portion having an outlet end exteriorly of the container at a level below said inlet end, and a loop portion joining said inlet and outlet portions at a pre-fixed height above the bottom of the container and being effective, when the water has accumulated within the container to substantially the top of said loop portion, to produce automatically, and without the movement of any parts, a siphonic-flow-discharge of the water from the container at a high rate and over a short period of time.

According to a more specific aspect of the invention, the inner diameter of said loop portion of the water discharge conduit joining said inlet and outlet portions is sufficiently small such that even at low rates of inletting the water into the container, the capillary rise resulting from the surface tension at said loop portion assures that substantially the complete cross-sectional area of said loop portion is filled with water before a discharge of the water occurs through the outlet conduit, thereby producing a simphonic-flow-discharge.

Water irriagating devices constructed in accordance with the foregoing features provide a number of important advantages over those in the known water irrigation systems. One important advantage is that the new devices enable very substantial savings to be made in the cost of the initial installation of the irrigation system, as well as in the cost of operating and maintaining the system, since the new devices may be operated at very low rates around-the-clock, thereby permitting the use of smaller-size pipes, pumps, filters, and the like, and obviating or reducing the need for control devices commonly included in sprinkler and drip irrigation systems. In addition, since the novel irrigation devices effect the discharge automatically by a simple siphonic conduit arrangement which does not require any moving parts, these devices are inexpensive to manufacture and maintain, and are very reliable in operation.

BRIEF DESCRIPTION OF THE DRAWINGS

The invention is herein described, by way of example only, with rerference to the accompanying drawings, wherein.

DESCRIPTION OF PREFERRED EMBODIMENTS

Figure 1:
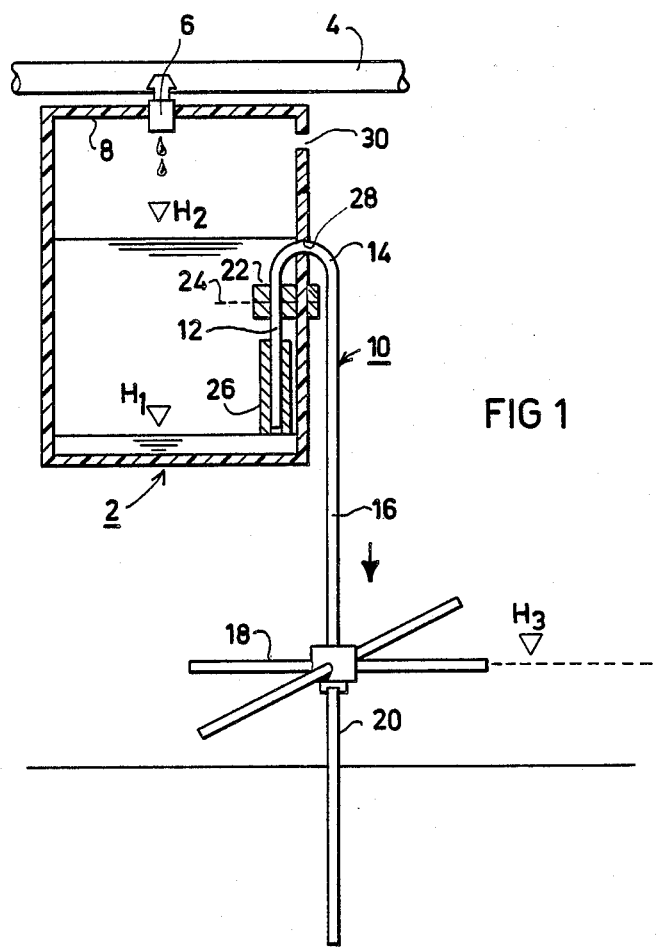
FIG. 1 is a sectional view illustrating one form of water irrigating device constructed in accordance with the invention.

FIG. 1 illustrates an irrigating devices including a container 2 adapted to be fed with water from a water supply pipe 4 at a slow rate via a drip-irrigation emitter 6 coupled to the supply pipe 4 and received within an inlet port formed through the top wall 8 of the container 2. The device further comprises a siphonic tube, generally designated 10, including an inlet portion 12 within the container and having an open end adjacent to the container bottom wall, a loop portion 14 extending to a predetermined height above the container bottom wall, and an outlet portion 16 having an open end leading exteriorly of the container and extending below its bottom, and also well below the bottom of the open end of the inlet portion 12. The outlet portion 16 of the siphonic tube 10 is provided with four distributor tubes 18 so as to distribute the exiting water.

Both the siphonic tube 10 and the water container 2 may be supported by a mounting 20 attached to the lower end of the siphonic tube 10 and embedded in the ground adjacent to the tree to be irrigated. For this purpose, the siphonic tube 10 is rigid and is clamped to the container 2 by a clamping member 22 secured to the container wall by a fastener 24. The inlet portion 12 of the siphonic tube may include a telescopic section 26, and the loop portion 14 of the siphonic tube passes through an opening 28 in the container wall. The container is preferably closed by top wall 8 as shown, in order to prevent the entry of dirt, insects, etc. and thereby to reduce the possibility of clogging. The container top wall 8 is formed with an opening 30 for venting the container interior to the atmosphere.

The irrigating device illustrated in FIG. 1 operates a follows:

Container 2 is continuously fed with water at a low rate and over a long period of time, e.g., around-the-clock, by means of the drip-irrigation emitter 6 coupled to the water pipe 4. The container is fed at a low rate, e.g., as low as 0.1 liters per hour, depending on the water requirements of the particular plant, the appropriate size drip emitter 6 being selected according to the desired rate. As the water accumulates within the container, the liquid level rises from that of the inlet end ($H_1$) of the siphonic tube 10 until it reaches substantially the top of its loop portion 14, as indicated by level $H_2$ in FIG. 1. As soon as level $H_2$ is reached, a siphonic discharge is effected of the quantity of water between levels $H_2$ and $H_1$ at a rapid rate via the siphonic tube 10, the discharged water being distributed at the lower level $H_3$ around the tree via the distributor tubes 18 at the outlet end 16 of the siphonic tube.

After the container 2 has been emptied by the siphonic discharge, it again refills at a low rate via the drip-irrigation emitter 6 and again discharges when it reaches level $H_2$.

The quantity of water discharged by each siphonic action is thus determined by the difference in height between the upper end of the siphonic tube loop 14, and the inlet end of the inlet portion 12. This difference in height may by pre-fixed to preset the discharge quantity by adjusting the inlet end of the inlet portion 12 via its telescoping section 26. The total quantity discharged over a period of time depends on the flow rate of the emitter, which may be selected according to the requirements of each case.

It will thus be seen that the siphonic discharge is automatically produced when the surface tension at the loop portion 14 of the siphonic tube 10 is such as to result in a sufficient capillary rise in the loop portion so that substantially its complet cross-sectional area is filled with water before any water is discharged through the outlet portion 16. Otherwise, instead of a rapid siphonic discharge being automatically effected when the liquid level rises to the top of loop 14, there will be produced a slow, non-siphonic trickle. In the description application, the diameter of the loop portion 14 of the tube should be sufficiently small, for exmple no greater than 7 mm, such that even at low inlet rates (e.g., as low as 0.10 liters per hour) the surface tension and resulting capillary rise at loop portion 14 assure that the discharge will be a rapid siphonic one.

Many other arrangements may be provided for assuring this. One other such arrangement is illustrated in FIG. 2.

Figure 2:
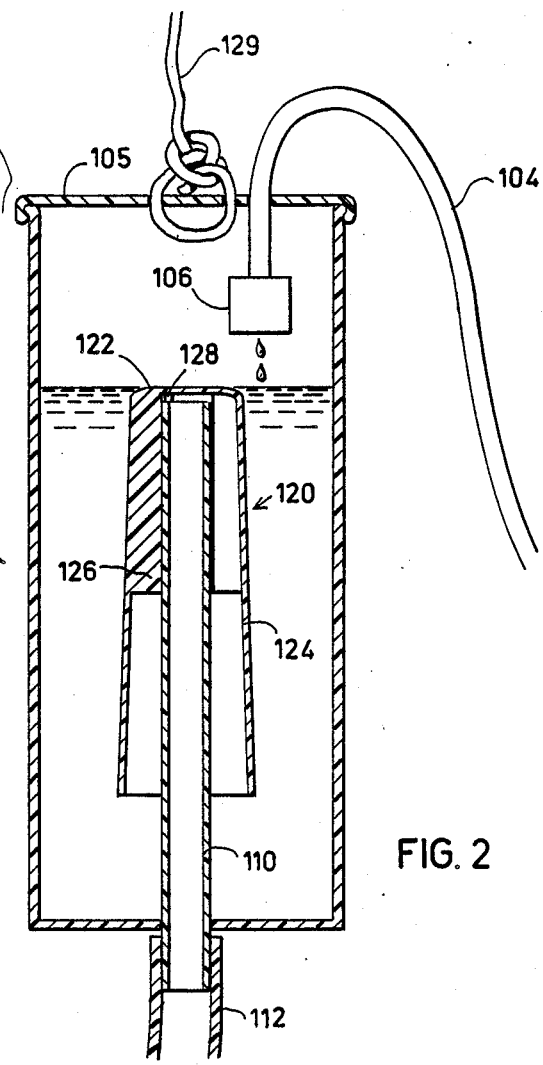
FIG. 2 is a sectional view illustrating a second form of device constructed in accordance with the invention.

Thus, the device illustrated in FIG. 2 also includes a container 102 continuously fed with water at a low rate, and over a long time period, by means of a water supply pipe 104 passing through an opening in the container top conver 105 and a drip irrigation emitter 106 disposed within the container The siphonic-flow discharge conduit in this case is constituted of two main elements, namely a tube 110 and a cap 120.

Tube 110 is open at both its ends and is press-fitted through an opening in the bottom wall of container 102 so as to extend vertically to a pre-fixed height within the container, which height determines the quantity of water accumulating within the container before a siphonic-flow-discharge is produced. The bottom of tube 110 projects exteriorly through the container bottom wall and receives an outlet tube 112 through which the discharged water flows to the plants.

Cap 120 includes a top wall 122 of circular configuration, and a side wall 124 of frusto-conical configuration, increasing in diameter from the top wall 122 to the open bottom end of the side wall. The inner face of the cap side wall 124 is formed with a plurality (e.g., three in this case) of ribs 126 which extend radially inwardly and are spaced circumferentially of the side wall. These ribs 126 occupy the upper end of the cap and extend to its top wall 122. The upper end of each rib 126 includes an extension 128 which extensions define axially-extending, circumferentially-spaced ribs in the inner face of the top wall overlying the open upper end of the tube 110. Thus, the radial ribs 126 space the inner face of the cap side wall 124 radially from the outer face of tube 110, and the axial ribs 128 space the lower face of the cap top wall 122 axially from the upper open end of tube 110.

Tube 110 and cap 120 together also form, as in FIG. 1, a siphonic-flow-discharge conduit, but in this case the inlet portion is defined by the space between the lower end of the cap side wall 124 and the tube 110, the loop portion is defined by the space between the inner face of the cap top wall 122 and the upper end of the tube 110, and the outlet portion is defined by the outlet tube 110 connected to the outlet pipe 112.

One important advantage in the FIG. 2 construction is that this construction is more susceptible to production in volume and at low cost. It will be appreciated that this construction also provides a siphonic-flow-discharge rather than a non-siphonic trickle. Thus, the cap top wall 122 spaced above the upper end of tube 110 defines a reservoir in which the water is accumulated by surface tension and capillary rise resulting from surface tension, to substantially fill the loop with water before any flow of the water occurs through the tube, thereby assuring that when a flow does occur through the tube, the flow will be sufficient to produce the siphonic discharge rapidly emptying the container.

For example, tube 110, at least its upper end, may have an inner diameter of 3-7 mm, and the lower face of the cap may be axially spaced from the upper end of the tube about 1-2 mm. Particularly good results have been obtained when the inner diameter of the tube is 6 mm, and the axial space between the lower face of cap wall 122 and the upper end of tube 110 is about 1.5-2 mm.

Figure 3:
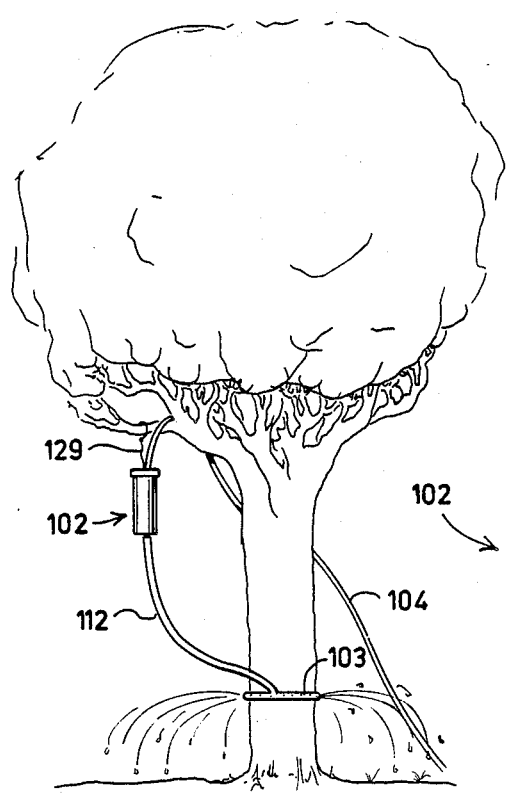

The illustrated irrigating device may be applied in a number of ways. Thus, FIG. 3 illustrates supporting the container 102 in suspension directly from the tree to be irrigated, by means of a wire, rope or string 129 secured to a tree branch and passing through the cover 105 of the container. In the arrangement illustrated in FIG. 3, the outlet discharge pipe 112 is connected to an annular distributor 103, which may be a plastic pipe or the like, received around the trunk of the tree and formed with a plurality of openings so as to effect a substantially equal distribution of the water around the tree.

Figure 6:
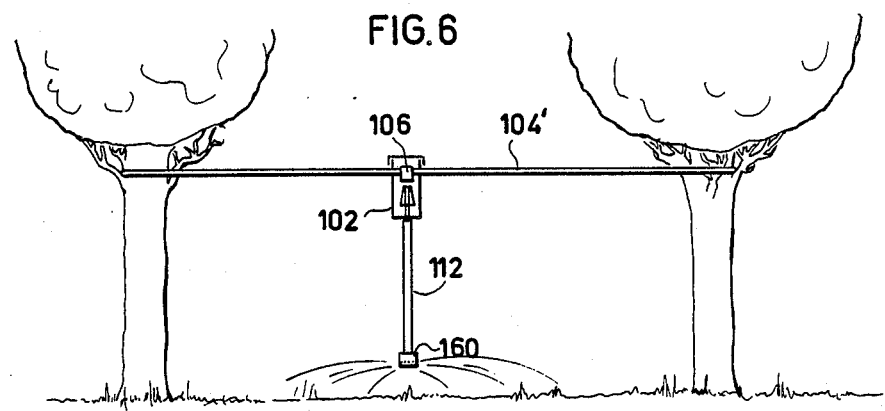
FIGS. 3-6 illustrate a number of manners of using the irrigation devices for irrigating trees.
Figure 4:
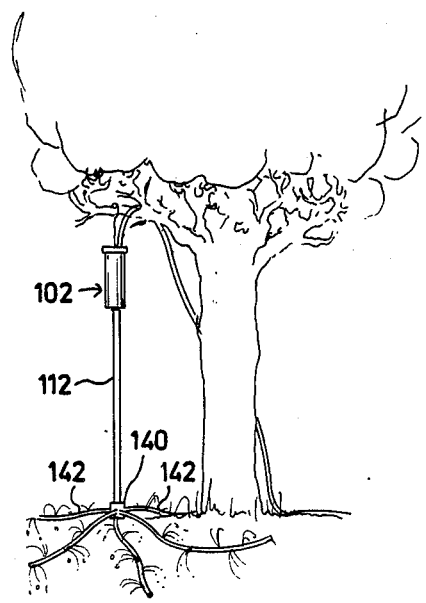
Figure 5:
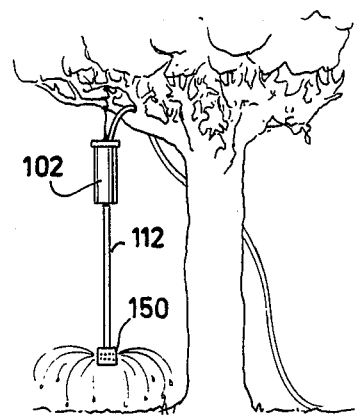

FIG. 4 illustrates a similar arrangement, except that the water discharge tube 112 is connected to a distributor 140 having a plurality of distributor tubelets 142 for distributing the water around the tree. FIG. 5 illustrates a similar arrangement, except that the distributor, therein designated 150, at the outlet end of the discharge tube 112, is suspended above the ground and is formed with a plurality of openings for distributing the water around the tree. FIG. 6 illustrates a still further arrangement wherein the container 102 of each irrigation device is supplied with an emitter 106 and is supported in suspension directly from the water supply line 104'. For example, one device may be provided for each pair of trees, with the water supply line 104' supported by the branches of the trees. The distributor 160 at the outlet end of the water discharge pipe 112 may be of the perforated type as shown in FIG. 5, or of the tubelet type as shown in FIG. 4.

While the embodiments of the invention illustrated in FIGS. 1 and 2 illustrate two arrangements wherein the loop portions of the discharge conduits are assured of being substantially filled with water before any discharge occurs through the outlet tubes to produce the siphonic discharge, it will be appreciated that many other arrangements could be used. For example, in the U-tube arrangement of FIG. 1, the tube could be made of larger diameter but slightly flattened (oval) at its loop portion, which will thereby assure that the loop portion is filled with water by surface tension and capillary rise before any discharge occurs through the outlet tube. Similarly, the arrangement illustrated in FIG. 2 could include a narrow stem centrally of the top wall 122 of the cap 120 depending within, but spaced from, the upper end of tube 110, which will also enable larger diameter tubes and/or greater spacing between cap and tube to be used.

Many other variations, modifications, and applications of the invention will be apparent.

What is claimed is:

1. A device for irrigating plants, comprising: a container adapted to be mounted adjacent to a plant to be irrigated, the upper end of the container being vented to the atmosphere; water inlet means connectable to a water supply pipe for inletting water into the container at a low rate over a long period of time; and a water discharge conduit carried by said container, said conduit including an open-ended tube; and a cap having a top wall overlying but vertically spaced from the upper end of the tube, and a side wall enclosing, but spaced laterally from and depending below the upper end of the tube; said cap being mounted on the upper end of said tube so as to be supported thereby, and including axially-extending, circumferentially-spaced, ribs on the inner face of its top wall engageable with the upper end of the tube for axially spacing the cap top wall vertically above the upper end of the tube; said cap further including radially extending circumferentially spaced ribs formed on the inner face of its side wall for frictionally gripping the outer face of the upper end of the tube; said tube, with the cap mounted thereon, being press-fitted within an opening in the bottom wall of the container so as to extend vertically to a pre-fixed height within the container to pre-fix the quantity of water accumulating therein effective to produce automatically, and without the movement of any parts, a siphonic-flow-discharge of water from the container at a high rate and over a short period of time.

* * * * *